United States Patent

Rau

Patent Number: 5,599,600
Date of Patent: Feb. 4, 1997

[54] NOZZLE REPAIR SHIELD

[75] Inventor: Steven E. Rau, Newark, Del.

[73] Assignee: Edlon, Inc., Avondale, Pa.

[21] Appl. No.: 442,132

[22] Filed: May 16, 1995

Related U.S. Application Data

[63] Continuation of Ser. No. 15,626, Feb. 9, 1993, abandoned.

[51] Int. Cl.$^6$ .................................................. B29D 23/00
[52] U.S. Cl. ............................ 428/36.9; 285/917; 285/918
[58] Field of Search ............................ 285/917, 15, 363, 285/918; 277/235 R, 212 F, 212 C, 212 R, 166, 179; 428/36.9

[56] References Cited

U.S. PATENT DOCUMENTS

| | | | |
|---|---|---|---|
| 2,329,000 | 9/1943 | Rembert | 29/451 |
| 3,199,879 | 8/1965 | Fleming | 277/212 |
| 3,561,776 | 2/1971 | Wilson | 277/206 |
| 3,653,672 | 4/1972 | Felt | 277/205 |
| 4,712,802 | 12/1987 | Hewison et al. | 277/212 |
| 5,144,824 | 9/1992 | Kobayashi et al. | 72/46 |

FOREIGN PATENT DOCUMENTS

| | | |
|---|---|---|
| 1059749 | 2/1967 | United Kingdom. |
| 1116951 | 6/1968 | United Kingdom. |

OTHER PUBLICATIONS

De Dietrich trade literature entitled "Installation Procedure for PTFE Nozzle Repair Sleeve" (1988).

Spectrum Products, Inc. trade literature and price sheet entitled "Easy Fix Nozzle Repair Sleeve" (1988).

Pfaudler trade literature entitled "Installation of Nozzle Repair Shields" (1984).

De Dietrich trade literature entitled "Kwik-Fix PTFE Nozzle Repair Sleeve" (1987).

Pfaudler trade literature entitled "Repair Materials for Glasteel/Nucerite Equipment" (1984).

IBG Monforts & Reiners GmBH & Co. trade literature entitled "IBG-PTFE Repair System for Glass-Lined Vessels" (1983).

Edlon Products, Inc. trade literature entitled "Pfluoro-Fix PTFE Nozzle Repair Shield Installation Instructions" (1992).

Primary Examiner—James J. Seidleck
Assistant Examiner—Michael A. Williamson
Attorney, Agent, or Firm—Synnestvedt & Lechner

[57] ABSTRACT

Nozzle repair shields and methods for installing them are provided by this invention. The nozzle repair shield includes a cylindrical body portion having an annular flange disposed from the top end and at least one sealing lip disposed at its lower end. The body portion further includes an annular support band located in its lower end for supporting the sealing lip during insertion and use. The preferred shield is constructed from machined PTFE stock, and further includes resilient spacing members between the sealing lips to further reduce damage to the sealing lips and subsequent loss of a fluid-tight seal.

23 Claims, 2 Drawing Sheets

NOZZLE REPAIR SHIELD

This is a continuation of application (s) application Ser. No. 08/015,626 filed on Feb. 9, 1993, now abandoned.

FIELD OF THE INVENTION

This invention relates to repair procedures for glass-lined containers, and more particularly, to polymeric repair shields used in repairing cracked or damaged glass-lined nozzle surfaces of such vessels.

BACKGROUND OF THE INVENTION

Glass-lined vessels used in the chemical and pharmaceutical industries often contain large openings, called nozzles, for the passage of contents to and from the vessel. During use, the protective glass coating along the surface of the nozzle often is damaged by sudden impacts and thermal cycling, leaving the underlining metal, which is typically steel, unprotected against the corrosive elements that the vessel may contain.

In glass-lined equipment, any damage to the glass lining, no matter how small, must be immediately repaired in order to prevent corrosion of the base metal and possible loss of the entire equipment. Several types of repair kits are commercially available; one type consists of a metal shield, generally tantalum, a polytetrafluoroethylene (PTFE) gasket, and a filler. Tantalum patch repair procedures include disposing a PTFE sleeve gasket along the damaged surface of the glass liner, followed by the addition of a resinous filler material, and then insertion of the outside tantalum shield over the filler. The tantalum flange is thereafter shaped, or peened, over the outside of the nozzle.

Although tantalum patches have been employed for years, they have some recognized deficiencies. At temperatures above 150° C., for example, tantalum is known to be attacked by concentrated hydrochloric, nitric, and sulfuric acids, bromine-containing chemicals, methanol, and hydrogen gas. It is also subject to galvanic corrosion, and often must be alloyed with tungsten to provide sufficient strength for repairs. Other metals, such as stainless steel, HASTELLOY, MONEL, INCONEL, nickel, titanium, and zirconium have been substituted for tantalum, and these too have similar disadvantages.

In an effort to reduce the labor intensive procedures and attendant costs of metal shields, the art has resorted to PTFE nozzle repair sleeves machined from virgin PTFE resin stock. PTFE nozzle repairs can be made at a fraction of the cost of tantalum repairs, and require no peening or metal working. The PTFE repair shield is simply inserted into the damaged nozzle opening and sealed with a filler material to provide a leak-proof repair. Over the years, PTFE repair shields have been improved with the addition of sealing lips, or fingers, which prevent the seepage of corrosive liquids from attacking the damaged vessel surface. Unfortunately, even these improved shield designs have had some drawbacks. It is known, for example, that PTFE sealing fingers are not very resilient and can heat-set at some of the higher operating temperatures used in chemical processing. If the sealing fingers deform, either during insertion or subsequent use, a small opening in the seal can lead to further damage of the nozzle, or destruction of the vessel. It is also known that, as the diameter of the nozzle repair shield approaches diameters greater than about 30 cm, the PTFE shield loses rigidity, and fails to hold the fingers against the glass surface in a fluid-tight manner. This also permits leakage, which is known to get worse as the temperature of the vessel gets higher.

Accordingly, there is a need for a nozzle repair shield which has greater dimensional stability at chemical processing temperatures, and which will exert a constant biasing force against the nozzle glass surface so as to prohibit leaks beneath the repair.

SUMMARY OF THE INVENTION

This invention provides repair shields for repairing damaged nozzle surfaces of glass-lined vessels, and the like. The repair shields of this invention include a cylindrical body portion having an annular flange disposed from a top end for limiting the inward movement of the shield when inserted into a nozzle. The body portion contains one or more sealing lips disposed at the opposite end from the flange for sealing the damaged portion of the nozzle surface from the contents of the vessel, which may contain strong acids, bases, or other corrosive media. In an important aspect of this invention, the shield includes an annular rigid support means disposed in an annular cavity along the lower end of the body portion. The rigid support means is located beneath the sealing lip so as to support the lip during insertion and service.

Accordingly, the repair kits and shields of this invention overcome the prior art deficiencies associated with PTFE shields. The preferred supporting bands of this invention are isolated from the corrosive media in the vessel, but improve the mechanical properties of the preferred PTFE sealing lips and body portions much like a skeleton in the human body. The combined structure of an inexpensive, corrosion-resistant shield, internally supported by a rigid band is ideally suited for large nozzle repairs in the chemical industry, where dimensional stability and resistance to strong bases and acids are important.

In alternative versions of this invention, resilient O-rings or tori can be inserted between the sealing lips in order to provide further mechanical dexterity. During use, these resilient spacing members help to support the sealing lip against the glass surface of the nozzle even when the equipment is used at high operating temperatures which would otherwise soften and distort the preferred PTFE sealing lips.

This invention also provides methods of repairing damaged glass-lined vessels in which the preferred repair shields are inserted into the nozzle over a damaged area and a filler material is inserted into the annular gap formed between the shield and the nozzle to provide an air-tight seal, resistant to the seepage of corrosive media.

BRIEF DESCRIPTION OF THE DRAWINGS

The accompanying drawings illustrate preferred embodiments of the invention as well as other information pertinent to the disclosure, and in which.

DETAILED DESCRIPTION OF THE INVENTION

Figure 1:
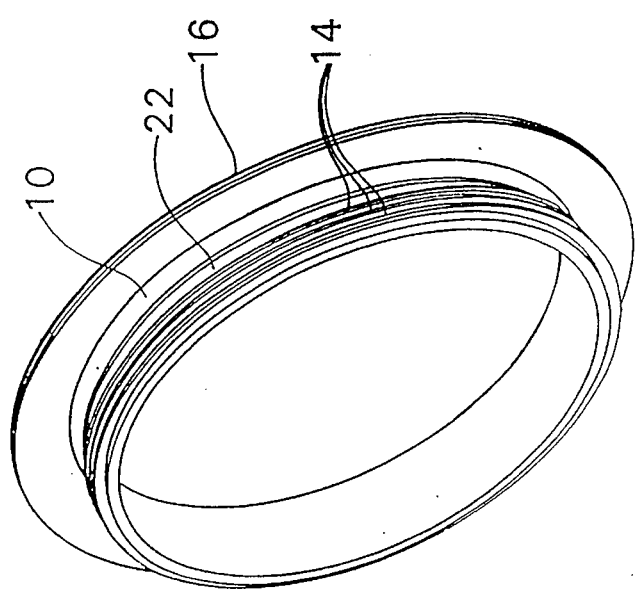
FIG. 1: is a perspective view of a preferred nozzle repair shield of this invention.
Figure 2:
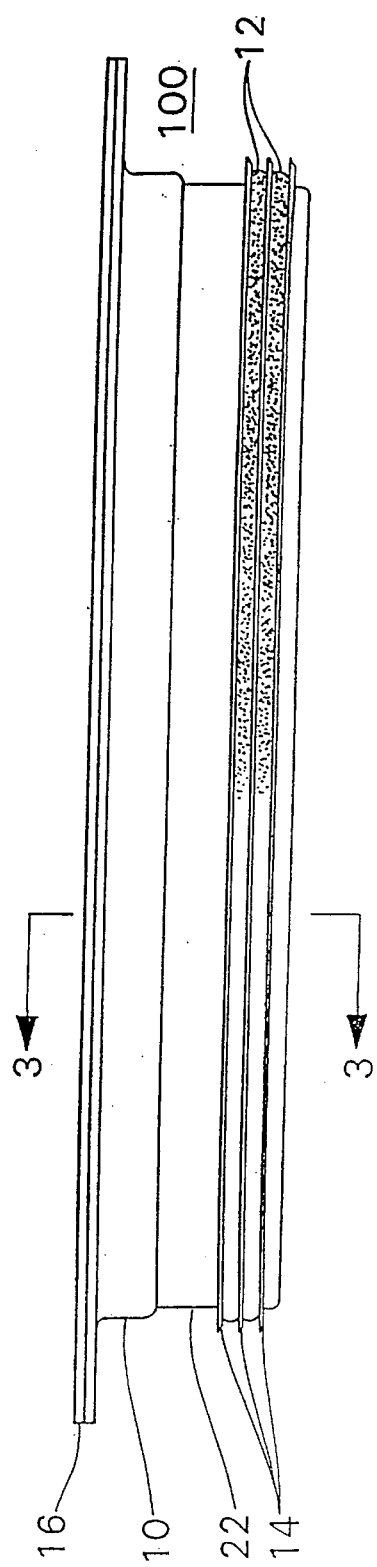
FIG. 2: is a side elevation view of the preferred nozzle repair shield of FIG. 1.
Figure 4:
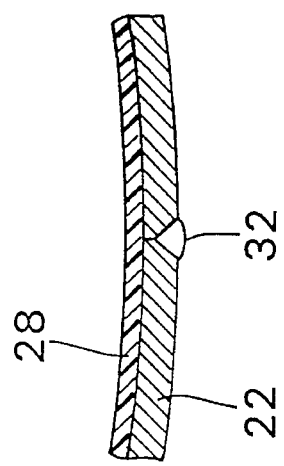
FIG. 4: is a partial top elevation, cross-sectional view, taken through line 4—4 of FIG. 3, illustrating a preferred upper support band having a welded seam.
Figure 3:
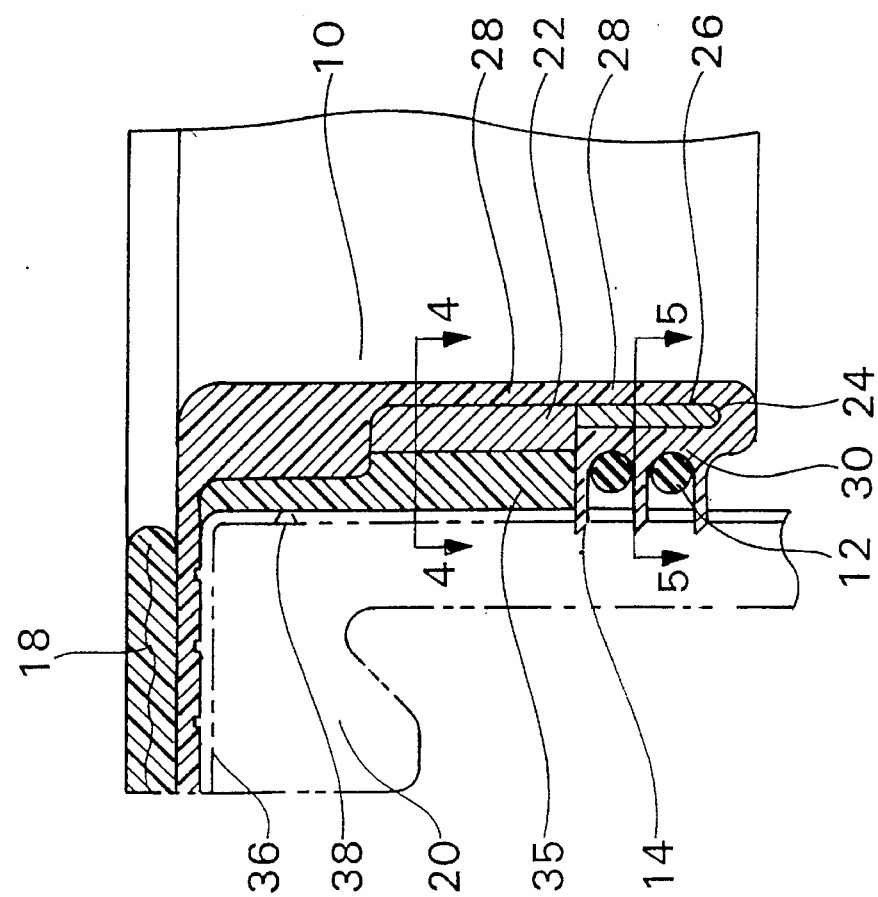
FIG. 3: is a side elevation, cross-sectional view, taken through line 3—3 of FIG. 2, illustrating the sealing of a defect in a glass-lined nozzle (shown in phantom)

With reference to the Figures, and particularly to FIGS. 1 and 2, there is described a preferred nozzle repair shield 100 having a cylindrical body portion 10 and an annular flange 16 disposed around the top or first end of the shield 100 for limiting the inward movement of the shield when it is inserted into an opening, such as a nozzle 20. The preferred shield 100 also includes one or more sealing lips 14. The sealing lips 14 are designed to seal the damaged portion 38 of, for example, a glass-liner 36 of a nozzle surface, from the contents of the vessel, as shown in FIG. 3. Also included in this embodiment are one or more O-rings 12 located between the sealing lips 14 for supporting the lips 14 during insertion and subsequent use of the shield 100. In an important aspect of the preferred shield 100, at least one annular support band 22 is provided beneath the sealing lips and inorganic compounds at temperatures in excess of about 50°–150° C. It should also be resistant to hydrofluoric acid and fuming sulfuric acids and acid media containing fluoride ions and hot oxalic acid, which are also known to attack tantalum patches. The preferred resins of this invention can include plastics and polymer-matrix composites (PMC's). The preferred polymers in PMC form can contain up to about 30 wt. % of a fiber selected from glass, graphite, boron, or aramids. These resinous materials have generally good corrosion resistance, and some of them, such as PTFE, can perform in very corrosive chemical environments where metals, including tantalum, are severely attacked. Similarly, plastics, such as liquid crystal polymers, polyketones, and polyphenylene sulfide (PPS) provide excellent chemical resistance, even at elevated temperatures. Of the many polymers that are available, polycrystalline, engineering thermoplastics, such as PTFE and nylon, are most desirable since they have chemical resistance typically superior to that of amorphous types, such as polycarbonate. Preferred engineering plastics useful in connection with the repair shields of this invention are found below in Table I along with their degregation characteristics.

TABLE I

Environmental Degradation[1] of Engineering Plastics at 25 and 95° C.

| Material | Aromatic hydrocarbons | | Aliphatic hydrocarbons | | Halogenated solvents | | Esters and ketones | | Alcohols | | Amines | | Weak bases and salts | | Strong bases | | Strong acids | | Strong oxidants | |
|---|---|---|---|---|---|---|---|---|---|---|---|---|---|---|---|---|---|---|---|---|
| | 25 | 95 | 25 | 95 | 25 | 95 | 25 | 95 | 25 | 95 | 25 | 95 | 25 | 95 | 25 | 95 | 25 | 95 | 25 | 95 |
| Nylon (polyamide) | 1 | 1 | 1 | 1 | 1 | 2 | 1 | 1 | 1 | 2 | 1 | 2 | 1 | 2 | 2 | 3 | 5 | 5 | 5 | 5 |
| Polycarbonate (PC) | 5 | 5 | 1 | 1 | 5 | 5 | 5 | 5 | — | 2–5 | — | 5 | 1 | 5 | 5 | 5 | 1 | 1 | 1 | 1 |
| Polyesters | 2 | 5 | 1 | 3–5 | 3 | 5 | 2 | 3–4 | — | — | — | — | 1 | 3–4 | 2 | 5 | 3 | 4–5 | 2 | 3–5 |
| Polytetrafluoroethylene PTFE | 1 | 1 | 1 | 1 | 1 | 1 | 1 | 1 | 1 | 1 | 1 | 1 | 1 | 1 | 1 | 1 | 1 | 1 | 1 | 1 |
| Polyimides | 1 | 1 | 1 | 1 | 1 | 1 | 1 | 1 | — | — | — | — | 2 | 3 | 4 | 5 | 3 | 4 | 2 | 5 |
| Polyphenylene Oxide (PPO) | 4 | 5 | 2 | 3 | 4 | 5 | 2 | 3 | — | 2–5 | — | 5 | 1 | 1 | 1 | 1 | 1 | 2 | 1 | 2 |
| Polyphenylene Sulfide (PPS) | 1 | 2 | 1 | 1 | 1 | 2 | 1 | 1 | 1 | 1 | — | 1–3 | 1 | 1 | 1 | 1 | 1 | 1 | 1 | 3 |
| Polysulfone (PSO) | 4 | 4 | 1 | 1 | 5 | 5 | 3 | 4 | 1 | 1 | — | 5 | 1 | 1 | 1 | 1 | 1 | 1 | 1 | 1 |
| Diallyl Phthalate (DAP) | 1–2 | 2–4 | 2 | 3 | 2 | 4 | 3–4 | 4–5 | — | — | — | — | 2 | 3 | 4 | 1–2 | 1–2 | 2–3 | 2 | 4 |
| Phenolics | 1 | 1 | 1 | 1 | 1 | 1 | 2 | 2 | 1 | 1 | — | — | 2 | 3 | 5 | 1 | 1 | 1 | 4 | 5 |

[1]1, no effect or inert; 2, Slight effect; 3, mild effect; 4, softening or swelling; 5, severe degradation.

14. The support bands 22 and 24 help the sealing lips 14 and thinner portions of the cylindrical body portion 10 to resist deformation under severe compressive forces, such as those experienced during insertion into a nozzle. The preferred elements of the shields of this invention, and construction of these elements will now be described.

The repair shield of this invention is preferably manufactured from a corrosion-resistant polymeric material. In order to achieve useful benefits over the prior art tantalum repair kits, this polymer substance should be resistant to organic The most preferred material for manufacturing the repair shield 100 of this invention is virgin PTFE. Starting from a billet, the flange 16 and sealing lips 14 can be easily manufactured into the general configuration of the shield 100 on a lathe. A groove is then machined into the rough shield under the sealing lips with the lathe tool to provide an annular cavity 26. The preferred wall of the cavity 26 generally assumes a J-shape cross-section having an inner cavity wall 28 and an outer cavity wall 30. The outer cavity wall 30 is preferably located beneath the sealing lips 14.

In an important aspect of the illustrated repair shield of this invention, annular supporting bands 22 and 24 are provided to provide more structural integrity and compressive strength to the shield construction, especially for shield diameters in excess of about 30 cm. The support band or bands ideally circumscribe the entire annular recess, and more preferably, extend further along the inner wall 28 of the cylindrical body portion 10. The annular support bands are ideally constructed of a material having a tensile strength of at least about 40 MPa, and preferably in excess of about 300 MPa. Materials having this level of tensile strength can be selected from high strength polymers and metals. Preferred materials include, for example, unreinforced engineering thermoplastics having a tensile strength ranging from about 55–103 MPa. One particularly useful engineering plastic includes nylon 6/6 having a tensile strength of about 83 MPa. Reinforced thermoplastics and thermosets are also suitable for this purpose, since reinforcing fibers of glass, boron, aramid, and graphite are known to increase the tensile strength of polymers by as much as ten times with little added expense. More preferably, however, the support bands 22 and 24 of this invention include a corrosion-resistant metal, such as stainless steel or nickel.

Figure 5:
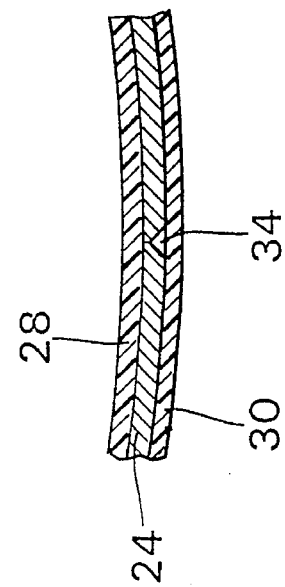
FIG. 5: is a top elevation, cross-sectional view, taken through line 5—5 of FIG. 3, illustrating a preferred lower support band having a welded seam.

It is envisioned that the support bands of this invention can be represented as a single supporting member, or a plurality of support bands as shown in FIG. 3. If metallic materials are used, they are typically formed into a strip material and mechanically deformed, for example, by swaging into a circular band configuration. The bands are then fitted around the annular groove in the central cylindrical body portion 10 along the upper portion of the inner wall 28. If two bands are employed, the first or lower support band 24 is fitted around the annular groove and then welded, preferably by TIG or MIG welding techniques, to provide a unitary structure, as described in FIG. 5. The weld 34 is then ground flush and the lower support band 24 is inserted into the annular cavity 26. At this location, the lower support band 24 is preferably bound on both sides by the inner and outer cavity walls 28 and 30, respectively. Next, the upper support band 22, which is preferably about 20–50% thicker than the lower support band, is wrapped around the annular groove and also welded to provide a weld bead 32. The weld bead 32 is then ground flush and the upper band is now in its desired location between the flange 16 and the lower support band 24. The upper and lower support bands 22 and 24 serve to both provide a structural skeleton for the sealing lips 14 and also permit a substantially continuous metal support structure for withstanding compressive loads caused during the insertion of the repair shield 100 into a nozzle, which is typically a tight compression fit.

This invention also preferably employs resilient spacing members, in the form of tori or O-rings located between the sealing lips 14. The preferred O-rings 12 are ideally manufactured from a resilient polymeric or rubber material, which can include a fluoroelastomer or natural or synthetic rubber. One particularly useful commercial O-ring product, that is suitable for the purposes of this invention is a VITON O-ring available from Sealing Specialties, Inc.

During the application of the preferred repair shields of this invention, special filler materials 35 are used under the repair to remove entrapped air, thereby minimizing, and preferably eliminating, any pressure differential between the vessel interior and the defect. This reduces the tendency of a corrodant to be pumped under the repair. The filler 35 also adds some rigidity to the relatively weak PTFE cylindrical body portions.

The filler material 35, however, is preferably not used as the primary barrier to corrosion and should not be used to fill in large corroded or damaged surfaces of the underlying metal vessel. These damaged surfaces or holes are more preferably repaired with a weld or putty filler such as titanium putty filler, or DEVCON. Preferred filler materials of this invention include furan and silicate cement.

In order to provide a more wettable surface for the filler to be adhered to, the preferred repair shields can include an etched surface facing the repair. PTFE is notorious for exhibiting a surface that is resistant to bonding to most adhesive substances. By creating an etched surface at the site of bonding of the shield to the filler, the adherent properties of the filler can be better exploited. Preferably, the wettable surface is prepared by etching with a sodium naphthalene dispersion in tetrahydrofuran, sodium ammonia, or plasma, although there will be other techniques that will become apparent to one of ordinary skill.

Finally, in most applications, an additional gasket 18 is employed over the outside surface of the flange 16 to cushion the connection to piping or other connecting equipment.

EXAMPLE

A 46 cm nozzle repair shield was manufactured by machining a block of virgin PTFE to form a annular flange and an inner cavity having a thickness of about 0.3 cm, as shown in FIGS. 1–3. The shield also included three annular sealing fingers of about 0.6 cm in length extending from an outer cavity wall and having a tapered leading edge of about 45° for easier insertion into the nozzle. Disposed between the sealing fingers were two 0.5 cm diameter X 43 cm I.D. VITON O-rings, Part No. AS-568-386, supplied by Sealing Specialties, Inc.

Into the cavity formed in the lower end of the shield was inserted a 0.3 cm thick X 1.9 cm wide stainless steel band which was wrapped around the annular groove of the body portion, TIG welded with stainless steel filler metal, ground to a flush finish, and inserted into the cavity. A second 0.6 cm thick X 2.5 cm long stainless steel band was wrapped around the annular groove in the cylindrical body portion, TIG welded and ground in the same manner as the first supporting band. The exterior PTFE surface of the shield is then etched in a sodium naphthalene dispersion in tetrahydrofuran.

The assembled repair shield is now ready for installation. In order to make the repair, the complete kit further contains furan filler, a plywood lined flange, a set of pulling bolts and clamps, a wrench, and a gasket.

The first step is to protect the undamaged glass areas before starting work. This can be accomplished with a rubber mat or suitable covering. The vessel should be completely dry and free of all contaminants. The nozzle area should be cleaned and free of all product build-up in order that the repair will be effective. The steel under the damaged area should be inspected for soundness. Steel that has been holed through should be repaired properly. Depressions over 0.3 cm deep should be filled by weld or with a commercial filler, such as DEVCON filled epoxy. The repaired areas should be ground smooth and flush. The furan filler is then mixed thoroughly so that it is ready for use. The repair shield is then inserted over the nozzle by pressing it into the nozzle opening using the blind flange and bolts provided with the kit. After the sealing fingers have been pressed into the nozzle, the procedure is temporarily halted, and filler is applied into the annular space between the nozzle and the repair shield as shown in FIG. 3. Care must be taken in order to avoid trapping air pockets or bubbles in the filler. The repair shield is then further pressed into the nozzle opening, while pausing periodically to add more filler. The shield flange face is then seated against the glass nozzle face and any extruded filler is cleaned up. Finally, the connective process piping or accessories are applied to the nozzle using a PFaudler CRT-AF gasket between the sealing face of the nozzle repair shield and the process piping. The filler is then permitted to cure following a set schedule prior to placing the equipment into service. Curing times for the preferred furan filler material are about 72 hours at 24° C.

In producing a successful repair, it is necessary that the upper lip of the shield be at least about 1 cm below the damaged area. The repair surface should be smooth, and the annular area between the shield and the nozzle should be filed with filler and void of all air pockets or bubbles.

From the foregoing, it can be realized that this invention provides repair shields suitable for many corrosion-resistant repairs, and are not necessarily limited to glass-lined vessels. The shields of this invention are easier to use and are less expensive than tantalum patches, but have the rigid dexterity of metal, and thus provide assurances against leaking. Although various embodiments have been illustrated, this was for the purpose of describing, but not limiting the invention. Various modifications, which will become apparent to one skilled in the art, are within the scope of this invention described in the attached claims.

What is claimed is:

1. A repair shield for repairing a damaged surface in the nozzle area of a glass-lined vessel, comprising:
   a polymeric, cylindrical body portion having first and second ends;
   an annular flange disposed at the first end of said body portion for limiting the inward movement of said shield when inserted into said nozzle;
   at least one sealing lip projecting substantially radially from the second end of said body portion for isolation the damaged nozzle surface from the contents of the vessel, said second end of said body portion comprising an annular cavity locate substantially coaxially with respect to said sealing lip, wherein the cavity has a diameter less than that of said lip; and
   at least one annular, rigid support means disposed in said annular cavity for providing support to said sealing lip during insertion and use.

2. The repair shield of claim 1, wherein said body portion comprises a plurality of sealing lips projecting substantially radially from its second end, and said annular cavity is located in a side wall of said shield, approximately the same axial distance as the sealing lips from the second end.

3. The repair shield of claim 2 comprising a fluorocarbon polymer.

4. The repair shield of claim 1, wherein said annular, rigid support means comprises a plurality of metal band wrapped around said cylindrical body, at least one of said bands being located within said cavity.

5. The repair shield of claim 4, wherein said lower end of said body portion comprises a plurality of sealing lips, in which at least two of said lips are separated by a resilient spacing member.

6. The repair shield of claim 5, wherein said resilient spacing member comprises an O-ring or torus.

7. The repair shield of claim 1, wherein said cylindrical body portion comprises PEFE resin.

8. The repair of claim 7, wherein said cavity comprises a machined annular recess located within said PEFE body portion.

9. The repair shield of claim 8, wherein said annular, rigid support means comprises at least one metallic band located within said recess beneath said sealing lip.

10. The repair shield of claim 8, wherein said annular, rigid support means comprises a plurality of metal bands fastened around said body portion and individually welded to form a pair of rings.

11. The repair shield of claim 1, wherein said annular, rigid support means comprises at least one polymeric band.

12. The repair shield of claim 11, wherein said annular, rigid support means has a tensile strength of at least about 40 MPa.

13. The repair shield of claim 1, wherein annular, rigid support means comprises at least one un-reinforced thermoplastic band.

14. The repair shield of claim 1, wherein said annular, rigid support means comprises at least one reinforced thermoplastic band.

15. A repair shield for repairing a damaged nozzle of a glass-lined vessel, comprising:
   a PTFE cylindrical body portion having first and second end;
   an annular flange disposed from the first end thereof limiting the inward movement of said shield when inserted into said nozzle;
   a plurality of integral annular sealing lips disposed at the second end of said body portion for sealing the damaged portion of the nozzle surface from the contents of said vessel, said second end of said body portion comprising an annular machined recess located beneath said sealing lips, in a radial direction;
   at least one resilient O-ring located between a pair of said sealing lips for resiliently supporting said lips; and
   at least one rigid metallic, supporting, annular band disposed in said annular machined recess for supporting said sealing lips during installation and of said repair shield.

16. The repair shield of claim 15, wherein said rigid metallic supporting annular band has a tensile strength of at least about 40 MPa.

17. A shield comprising:
   a cylindrical, polymeric body portion having first and second ends, the second end of the body portion having an annular cavity;
   an annular flange extending proximately from the first end of said body portion;
   a sealing lip extending substantially radially from the annular cavity and the second end of said body portion; and
   an annular, rigid support band disposed in the annular cavity for providing support to said lip during insertion and use of said shield.

18. The shield of claim 17, wherein said shield comprises a plurality of said sealing lips and at least one O-ring or torus disposed between at least two of said sealing lips.

19. The shield of claim 17, wherein said cylindrical body portion comprises a PTFE polymer, and said support band is disposed within a machined recess in said body portion.

20. The shield of claim 17, wherein said support band comprises at least two metallic annular section disposed around said cylindrical body portion.

21. The shield of claim 20, wherein said cylindrical body portion comprises an annular recess, and at least a first of said metallic annular section is disposed within said recess.

22. The shield of claim 17, wherein an exterior surface of said shield comprises an etched or abraded surface.

23. The repair of shield of claim 22, wherein said annular, rigid support band has a tensile strength of at least about 40 MPa.

* * * * *